Aug. 23, 1949.　　　　　J. E. DAVIS, JR　　　　2,479,558
PORTABLE HOT WATER HEATER UNIT
Filed Nov. 19, 1945
2 Sheets-Sheet 1
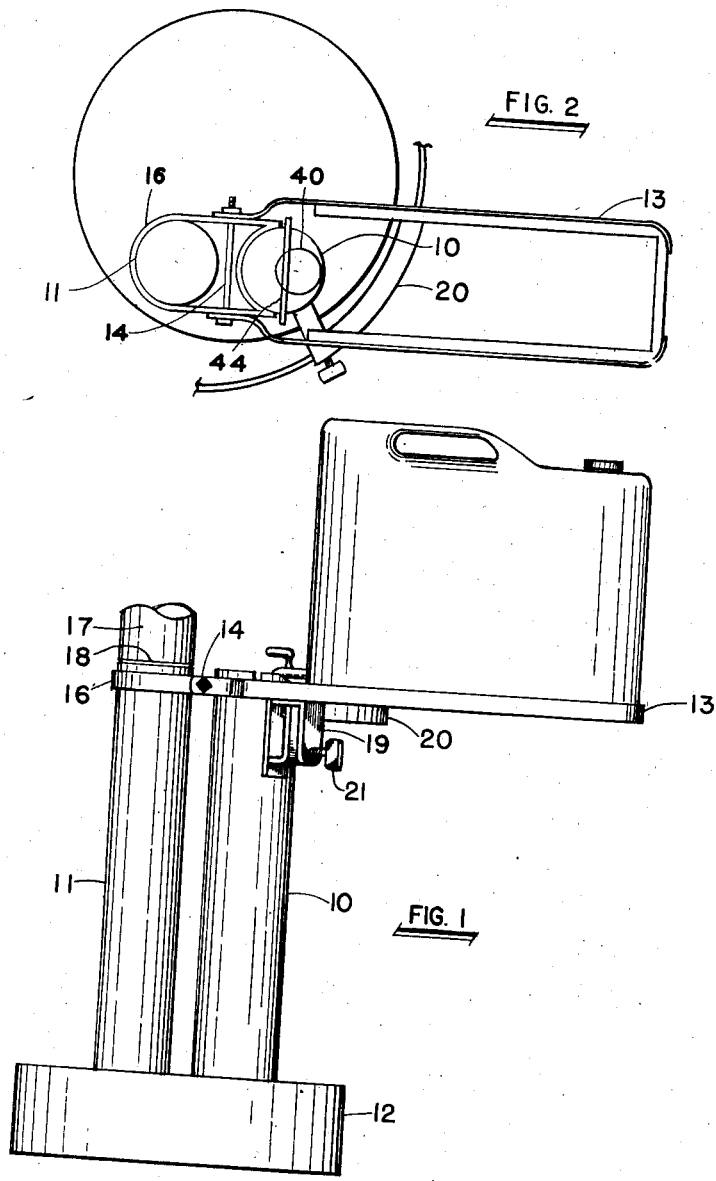
Inventor
JOHN E. DAVIS.
By Ralph L. Chappell
Attorney Aug. 23, 1949.                    J. E. DAVIS, JR                    2,479,558
                          PORTABLE HOT WATER HEATER UNIT
Filed Nov. 19, 1945                                                2 Sheets-Sheet 2

Inventor
JOHN E. DAVIS
By Ralph L. Chappell
Attorney

Patented Aug. 23, 1949

2,479,558

UNITED STATES PATENT OFFICE 2,479,558

PORTABLE HOT WATER HEATER UNIT

John Eayres Davis, Jr., United States Navy

Application November 19, 1945, Serial No. 629,685

3 Claims. (Cl. 126—360)

(Granted under the act of March 3, 1883, as amended April 30, 1928; 370 O. G. 757)

This invention relates to portable water heaters. In particular it relates to portable water heaters some of the elements of which have a hinged relationship to others, or are sectional so that the heater is adapted to be readily disassembled and parts thereof separated.

One object of the invention is to provide a portable water heater which is adapted to burn liquid fuel. Another object is to provide an immersible, portable water heater which is adapted for quick assembly and for compact stowing. A third object is to produce a portable water heater which is convenient to manufacture and which is efficient in operation.

It is known in the art to provide portable water heaters of various and sundry types to accomplish specific functions, such as heating tanks or troughs of water in agricultural operations, but it has not been the practice to so construct these heaters that they are capable of compact stowage.

In order to have a clearer conception of one embodiment of this invention, reference is made to the drawings in which:

Figure 1 is an elevation showing the intake and vent flues, the combustion chamber and the fuel tank supporting bracket.

Figure 2 is a plan view of the same.

Figure 3:
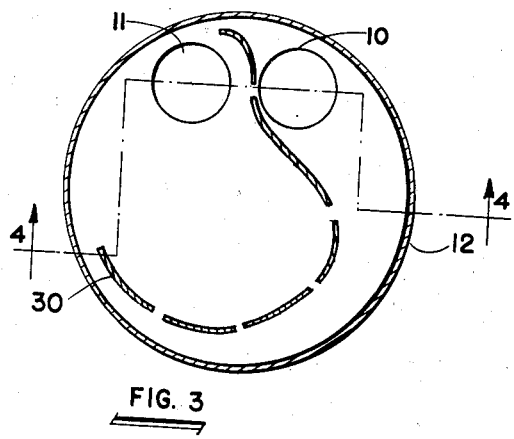
Figure 3 is a horizontal sectional plan view taken through the combustion chamber, along section line 3—3 in Figure 4, with the burner assembly removed.
Figure 4:
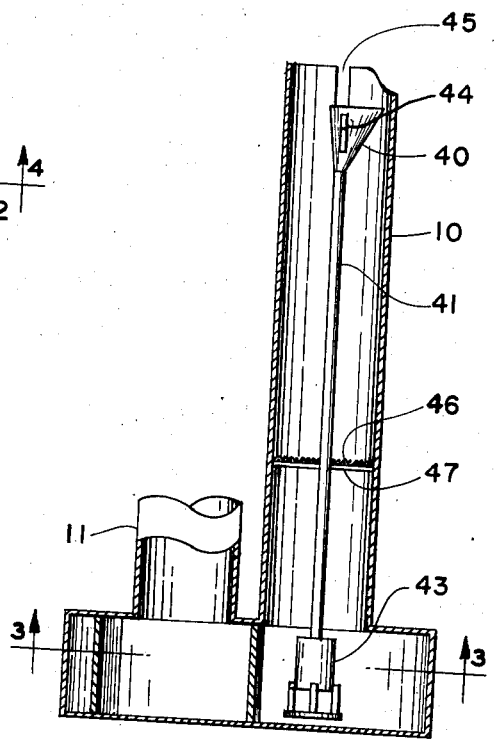
Figure 4 is a sectional view, partly in section and partly in elevation, taken along line 4—4 of Figure 3.

Referring to the drawings, particularly Figure 1, 10 represents the intake flue and 11, the vent flue, both of which are connected to combustion chamber 12. Fuel tank supporting bracket 13 is rotatably supported by bolt 14 which in turn is supported by spacing bar 16. The latter is tack welded to the intake and vent flues and serves to hold them in spaced relationship. Vent flue 11 consists of sections of pipe, one of which is indicated by 17. These sections interfit in the conventional manner as at 18. Retainer clamp 19 is welded to intake flue 10 and has projecting therefrom a channel 20 which functions as a stabilizer for the device when the latter is immersed in a tank of water. Retainer clamp 19 is held in position over the edge of a tank of water by means of screw 21. The buoyancy of the immersed combustion chamber is thereby overcome. In the intake flue the burner assembly consisting of funnel 40, tube 41 and burner 43 is supported in vertical position by means of cross-bar 44 which is welded to funnel 40 and is supported in notch 45 in the upper edge of intake tube 10.

Foraminous screen 46 held by frame 47 is positioned intermediate to the funnel and burner on tube 41. It is welded to the latter and functions as a "flare-back" or back fire preventer. In combustion chamber 12, a series of baffles 30 are spaced with relation to each other for the purpose of distributing the products of combustion to the outer part of the combustion chamber in their passage from the burner to the vent flue. They are spaced along an irregular curve which is approximately spiral in contour. Openings between the baffles are arranged so as to regulate the draft and thereby promote the uniform distribution of heat in the combustion chamber.

The device is quickly assembled for operation from stowage; likewise, it is quickly taken apart after operation when it is desired to re-stow.

The operation of the device is as follows: After it has been assembled and placed in a tank it is clamped in position by retainer clamp 19. Water to be heated is then introduced into the tank. The burner assembly is withdrawn from the intake vent and liquid fuel is placed in the burner and ignited. The burner assembly is then replaced in the inlet vent. A conventional can of liquid fuel, i. e. a five gallon can of gasoline of the type standardized by the Army is placed on bracket 13. This can is provided with a petcock which discharges into funnel 40. The petcock is now opened and fuel allowed to drip into the funnel, passing therefrom to the burner. In a very short period of time a draft is set-up into the outlet vent and the heat generated by the burner passes rapidly to the surrounding water.

Figure 5:
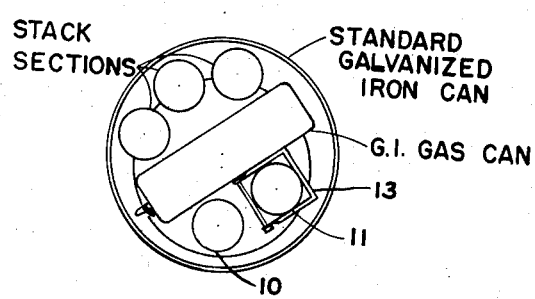
Figure 5 is a plan view showing the device stowed in a conventional can.

One of the characteristics of this device is its stowability. It can be stowed in a relatively small space and is very important in this respect as to use by the Army and Navy. In stowing the fuel tank is removed from the supporting bracket. The sections of the outlet vent pipe are removed with the exception of the one which is rigidly attached to the combustion chamber and the intake vent. Bracket 13 is rotated over the vent pipe to its lowest position and the device is then placed, for example in a standard can. The gas tank is placed immediately in front of the inlet and outlet flues and the extra sections of vent pipe are placed in front of the tank, all as illustrated in Figure 5.

The device is relatively free from sooting in operation. It is quickly cleaned after operation and is easily maintained in a sanitary condition.

While the embodiment herein shown has disclosed the device as applicable to cylindrical tank to heat a comparatively small quantity of water, it is not desired to be limited thereto as it is obvious to one familiar with the art that several units could be employed in heating a much larger quantity of water and changes in a cross-sectional shape of the flues, in the configuration of the tank supporting bracket, and in the supporting clamp and stabilizing channel, could be made without departing from either the spirit or scope of the invention.

This invention may be made or used by or for the Government of the United States for governmental purposes without the payment to me of any royalties thereon or therefor.

What I claim is:

1. In a portable water heater adapted to be immersed in a tank of water for heating, the combination of means forming a combustion chamber, intake and sectional outlet flues connected to said combustion chamber, a fuel burner provided with a fuel feeding tube mounted within the intake flue and positioned within the combustion chamber, clamping means rigidly connected to and spacing the said intake and outlet flues, a clamp provided with a laterally extending channel member and rigidly attached to said intake flue, a bracket member hingedly mounted on said clamping means formed and adapted in open position to rest on said clamp and laterally extending channel member and in closed position to pivot over the inlet and outlet flues to occupy a position alongside said outlet flue, with a fuel tank adapted to feed fuel to the burner and to be freely supported by said bracket when the latter is in open position, the said combination being adapted to be readily assembled for operation and disassembled for compact stowage.

2. A portable water heater adapted to be immersed in a tank of water for heating, comprising means forming a combustion chamber, intake and outlet flues connected to the combustion chamber, clamping means rigidly connected to and spacing the said intake and outlet flues, a clamp provided with attachment means and with a laterally extending arcuate channel member and rigidly attached to said intake flue, a bracket hingedly pivoted on said clamping means at a point midway between said intake and outlet flues formed and adapted in open position to rest on said clamp and laterally extending arcuate channel and in closed position to pivot over the intake and outlet flues to occupy a position alongside said outlet flue, a fuel burner provided with a fuel feeding tube mounted within the intake flue and positioned within the combustion chamber, a foraminous metallic screen attached to the fuel feeding tube within the intake flue and extending across the passage area of said flue, and a fuel tank adapted to feed fuel to the burner, said tank being freely supported on said bracket when the latter is in open position.

3. A portable water heater adapted to be immersed in a tank of water for heating purposes comprising means forming a combustion chamber, intake and sectional vent flues connected to the combustion chamber, a screw clamp provided with a laterally extending stabilizing channel adapted to fit over the rim of the tank and rigidly attached to said intake flue, clamping means including a metallic bar rigidly attached to and spacing the said intake and vent flues in parallel relationship, bracket means hingedly mounted on said clamping means at a point midway between the intake and vent flues formed and adapted in open position to rest on said screw clamp and laterally extending stabilizing channel and in closed position to pivot over the intake and vent flues to occupy a position alongside said vent flues, a liquid fuel burner provided with a fuel feeding tube and funnel positioned within the combustion chamber, the tube and funnel extending into the chamber, the tube and funnel supported thereby, a series of intake flue and supported thereby, a series of baffle plates positioned within the combustion chamber, spaced with respect to each other and arranged and adapted to distribute the products of combustion emanating from the burner within the combustion chamber, a foraminous metallic screen attached to the fuel feeding tube within the intake flue and extending across the passage area of said flue, and a fuel tank, freely supported on the bracket means when in open or operating position, adapted to feed fuel to the burner, the entire water heater adapted by reason of the separability of the vent flue, the separability of the fuel tank from the supporting bracket and the hinged relationship of the supporting bracket to the flue clamping means, to be readily assembled for operation and disassembled for compact storage.

JOHN EAYRES DAVIS, Jr.

REFERENCES CITED

The following references are of record in the file of this patent:

UNITED STATES PATENTS

| Number | Name | Date |
|---|---|---|
| 412,821 | Wright | Oct. 15, 1889 |
| 703,087 | Schenk | June 24, 1902 |
| 1,995,508 | Hartung | Mar. 26, 1935 |
| 2,300,981 | Skolas | Nov. 3, 1942 |